Oct. 16, 1962    E. C. JORDAN    3,058,609
TRAILER
Filed Oct. 4, 1961    2 Sheets-Sheet 1
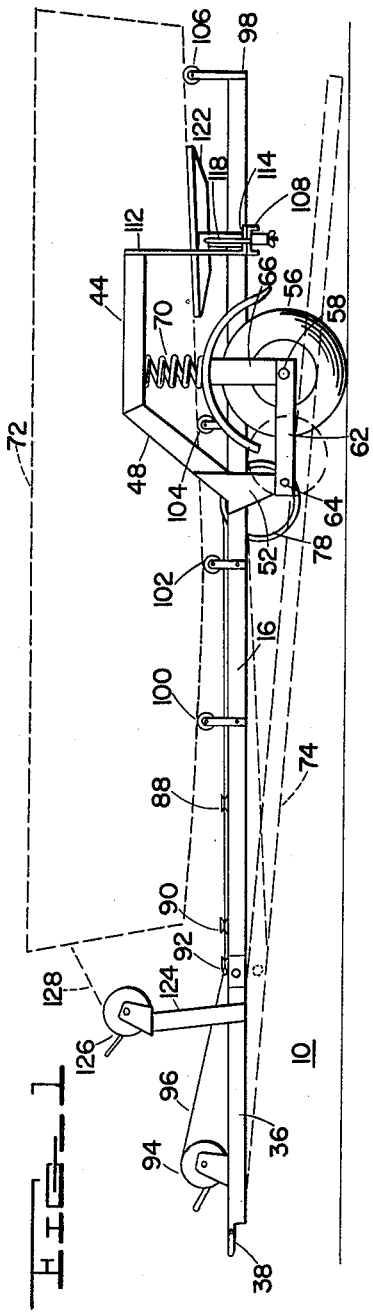
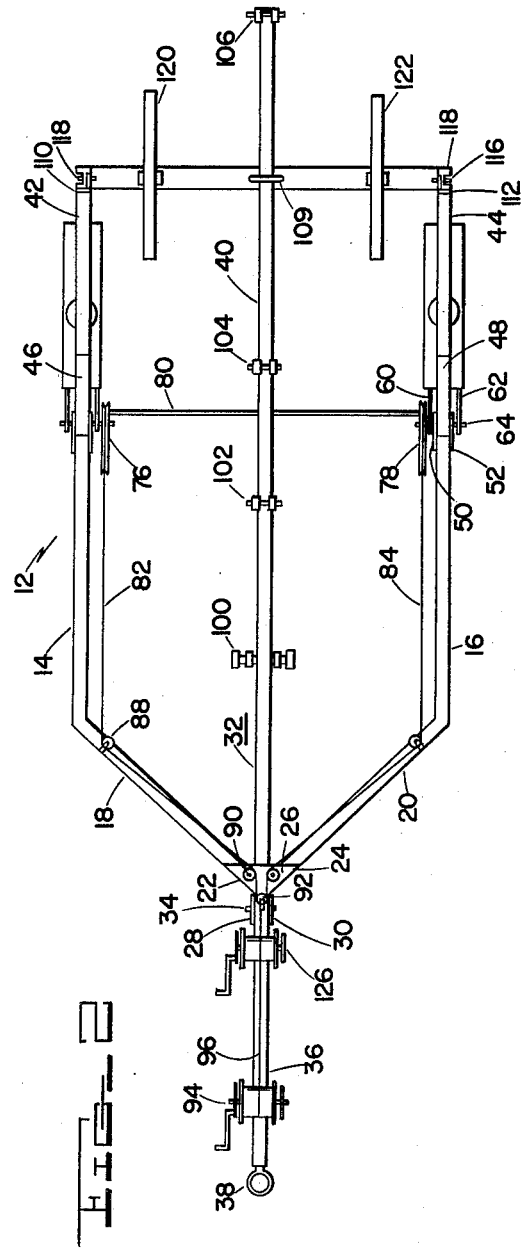
INVENTOR.
ELZA C. JORDAN
BY *Dust & Irish*
ATTORNEYS Oct. 16, 1962  E. C. JORDAN  3,058,609
TRAILER
Filed Oct. 4, 1961  2 Sheets-Sheet 2
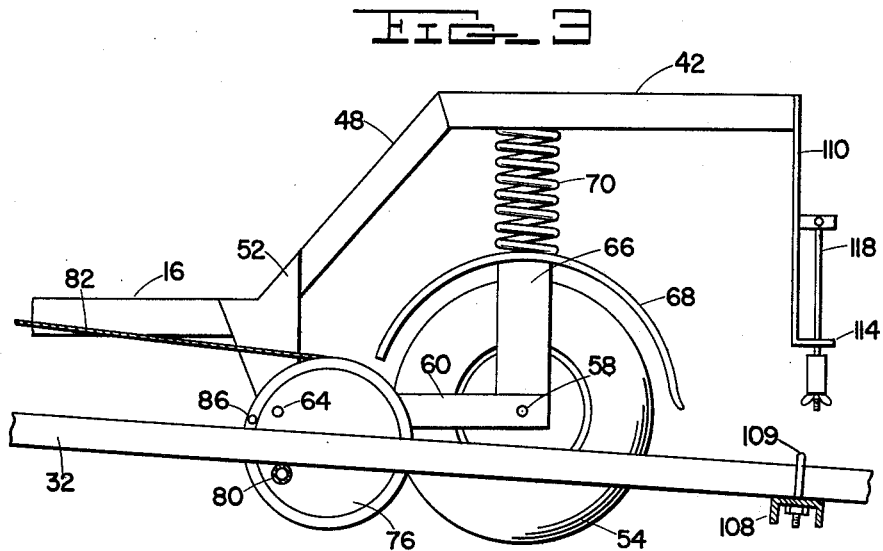
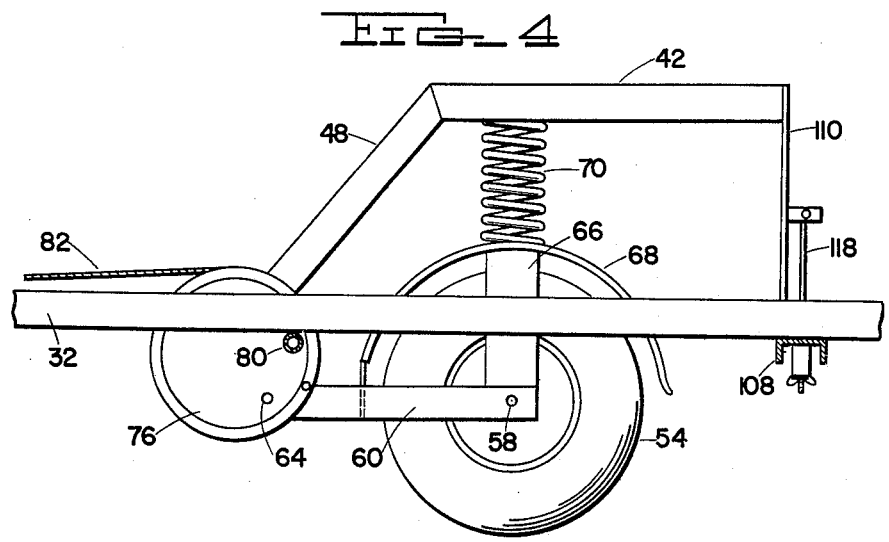
INVENTOR.
ELZA C. JORDAN
BY *Gust & Irish*
ATTORNEYS US United States Patent Office 3,058,609
Patented Oct. 16, 1962

3,058,609
TRAILER
Elza C. Jordan, Rte. 3, Auburn, Ind.
Filed Oct. 4, 1961, Ser. No. 142,900
11 Claims. (Cl. 214—505)

This invention relates generally to trailers, and more particularly to trailers for transporting boats.

Two-wheeled trailers designed to be towed by a passenger car or light truck are now commonly employed for transporting small boats. Such trailers conventionally comprise a frame adapted to be lowered so that the boat may be pulled thereon by means of a cable and winch, and subsequently raised so that the loaded trailer can be towed on the highway. In the design of such trailers, ease of loading the boat onto the trailer and of elevating the boat-supporting frame and boat into the travelling position are important considerations. To this end, it is desirable that when lowered, the movable part of the frame be in engagement with the ground so that minimum lifting of the bow end of the boat in order to load it onto the trailer is required. Further, it is frequently desirable to load a boat directly from the water onto the trailer and thus the trailer is frequently backed into the water and the boat floated thereon. In order to prevent the wheels of the trailer from being stuck in the mud or sand at the water's edge, it is also desirable that the movable portion of the frame extend rearwardly of the wheels so that it can extend into the water without the necessity for backing the trailer wheels into the water. It is further desirable that a boat trailer be of minimum weight to facilitate its being towed by passenger cars, and it is of course further desirable that this construction and particularly the frame lowering and raising mechanism be characterized by its simplicity, ease of assembly, and thus relatively low cost.

It is accordingly an object of my invention to provide an improved trailer of the type having a load-supporting frame movable between lower and upper positions.

Another object of my invention is to provide an improved boat trailer.

A further object of my invention is the provision of a boat trailer having improved mechanism for loading the boat thereon and raising the same to the travelling position.

A still further object of my invention is the provision of an improved boat trailer characterized by the ease of loading the boat thereon and raising the same to the travelling position.

Further objects and advantages of my invention will become apparent by reference to the following description and the accompanying drawing, and the features of novelty which characterize my invention will be pointed out with particularity in the claims annexed to and forming a part of this specification.

My invention, in its broader aspects, provides a trailer having a first elongated frame with front and rear ends and comprising a pair of side rail members transversely spaced apart at the rear end. A pair of wheels are provided respectively connected to the side rail members adjacent the rear end for supporting the trailer on the ground. A second elongated load supporting frame is provided extending between the side rail members and pivotally connected to the first frame adjacent the front end thereof for movement between lower and upper positions. A camming member is provided extending transversely across the first and second frames and having a camming connection with the second frame. Means are provided respectively pivotally connected to the side rail members for movement between first and second positions and having said camming member respectively connected thereto so that the second frame is moved between its lower and upper positions responsive to movement of the pivotally connected means between its first and second positions. Means are provided connected respectively to the pivotally connected means for moving the same between the first and second positions thereof.

In the drawing:

FIG. 1 is a side elevational view of the improved trailer of my invention;

FIG. 2 is a top view of the trailer of FIG. 1;

FIG. 3 is a fragmentary side view, partly in cross-section, illustrating the improved raising and lowering mechanism of my invention in the lowered position thereof; and FIG. 4 is a view similar to FIG. 3 showing the mechanism in the travelling position thereof.

Referring now to the figures of the drawing, my improved trailer, generally identified at 10 includes an outer frame 12, preferably formed of suitable steel channel members. Frame 12 has spaced parallel side rails 14 and 16 respectively joined, as by welding, to members 18 and 20 which merge to form a generally V-shaped configuration but which have their adjacent ends 22 and 24 spaced apart; ends 22 and 24 of the members 18 and 20 are secured together by a gusset plate 26. The web portions of the channel-shaped members 18 and 20 at ends 22 and 24 are preferably extended in spaced, parallel relationship to form bearing plates 28 and 30.

An elongated tongue 32, also preferably formed of a suitable steel channel, is provided extending between the ends 22 and 24 of members 18 and 20 and pivotally connected to the bearing plates 28 and 30 by means of a pivot stud 34. Tongue 32 thus has a forward portion 36 having a suitable towing hitch 38 formed at its forward end, and a rearwardly extending portion 40 which extends between side rails 14 and 16 and parallel therewith.

Side rails 14 and 16 respectively have rear portions 42 and 44 which are offset vertically with respect to the forward portions of the side rails and integrally connected thereto by rearwardly inclined portions 46 and 48. Each of the side rail members 14 and 16 has a pair of bearing plates 50 and 52 respectively secured to its opposite sides adjacent its junction with the respective portion 46, 48, as by welding, and depending therefrom, as shown. A pair of wheels 54 and 56 are provided respectively disposed under side rail portions 42 and 44. Each of the wheels 54 and 56 is rotatably supported by means of an axle 58 extending through the rear ends of lever members 60, 62 on opposite sides of the respective wheel, the forward ends of the lever members 60 and 62 being respectively pivotally connected to the bearing plates 50 and 52 by means of pivot stud 64.

Each of the wheels 54, 56 has a U-shaped bracket member 66 extending upwardly therefrom which supports fender 68 and spring suspension for the trailer is provided by means of coil springs 70 disposed between the respective side rail portions 42 and 44 and the brackets 66, as shown.

Tongue 32 is adapted to support a boat 72, shown in dashed lines in FIG. 1, and is pivotally movable by means of pivot stud 34 between a lower loading position, as shown in dashed lines 74 in FIG. 1, and a raised travelling position as shown in solid lines. In order to provide for such pivotal movement of tongue 32 between its loading and travelling positions, I provide a pair of sheaves 76 and 78 eccentrically connected to the inner sides of bearing plates 50 and 52 by means of pivot studs 64. A camming bar 80 has its ends respectively connected to the sheaves 76, 78 at points radially spaced from the pivot studs 64, camming bar 80 extending transversely across the tongue 32 and having a camming engagement with the bottom side of its rearwardly extending portion 40, as best seen in FIGS. 3 and 4. Reference to FIGS. 3 and 4 will clearly reveal that sheaves 76, 78 have a first lower rotational position in which camming rod 80 permits tongue 32 to pivot downwardly to its loading position 74, and a second upward rotational position in which the camming rod 80 moves the tongue 32 upwardly to its travelling position.

In order to provide for the eccentric rotation of the sheaves 76 and 78 about pivot studs 64, a pair of cables 82 and 84 are respectively connected to sheaves 76 and 78, as at 86, and are trained partially therearound. Cables 82 and 84 are trained around sheaves 88 and 90 on frame members 18 and 20 and around another sheave 92, it being understood that cables 82 and 84 actually form a continuous length of cable having its two ends respectively connected to sheaves 76, 78. Sheave 92 is in turn connected to winch 94 on forwardly extending tongue portion 32 by means of cable 96. It will now be seen that with tongue 32 in its lower position 74, as shown in dashed lines in FIG. 1, and as shown in FIG. 3, operation of winch 94 to wind cable 96 thereon will pull sheave 92 and thus cables 82 and 84 thus in turn to rotate sheaves 76, 78 from their lower positions as shown in FIG. 3 to their upward positions as shown in FIG. 4, thereby pivotally raising tongue 32 to its travelling position.

It will be observed that the rear end 98 of tongue 32 extends considerably rearwardly of the wheels 54, 56 thus permitting the trailer to be backed to the water's edge and with the end 98 of the tongue extending into the water to permit loading a boat thereon directly from the water. Tongue 32 has suitable rollers 100, 102, 104 and 106 thereon for supporting the boat 72.

In order to provide for locking the tongue 32 in its travelling position and also to provide support for boat 72, a locking member 108, also preferably formed of suitable steel channel, is secured, as by U-bolt 109, to the bottom surface of the rear portion 40 of tongue 32 rearwardly of wheels 54, 56, and extends transversely with respect thereto. A pair of bracket members 110 and 112 are respectively secured to the rear ends of side rail portions 42, 44 and depending therefrom. Each of the bracket members 110, 112 has a flange portion 114 formed thereon, the flange portion 114 respectively engaging the ends of locking member 108 when tongue 32 is in its upper or travelling position. The ends of locking member 108 and flanges 114 of brackets 110, 112 respectively have notches formed therein through which locking bolts 118 extend thereby removably to secure the ends of locking member 108 to the flanges 114 of brackets 110, 112 and thus in turn securely to lock tongue 32 in its traveling position.

In order stably to support the boat 72 on the tongue 32 a pair of suitable bolsters 120, 122 are mounted on the transversely extending locking member 108 respectively on either side of tongue 32, bolsters 120, 122 engaging and supporting the bottom of the boat 72 when the same is fully loaded on the tongue 32. In order to load the boat 72 on the tongue 32, a suitable bracket 124 is secured to the forwardly extending portion 36 of tongues 32 and extends upwardly therefrom. Another winch 126 is mounted on bracket 124 and is employed for loading the boat 72 onto the tongue 32 by means of a suitable cable shown in dashed lines 128.

It will now be seen that I have provided a boat trailer wherein a boat is easily loaded onto the supporting portion of the frame, which in turn is easily raised from the lowered position to the travelling position thereof. It will further be seen that my trailer construction and particularly the frame raising and lowering mechanism is characterized by its simplicity, ease of assembly, and lightness of weight thus contributing to a relatively low over-all cost.

While I have illustrated and described a specific embodiment of my invention, further modifications and improvements will occur to those skilled in the art and I desire therefore in the appended claims to cover all modifications which do not depart from the spirit and scope of my invention.

What is claimed is:

1. A trailer comprising: a first elongated frame having front and rear ends and comprising a pair of side rail members transversely spaced apart at said rear end; a pair of wheels respectively connected to said side rail members adjacent said rear end for supporting said trailer on the ground; a second elongated load-supporting frame extending between said side rail members and being pivotally connected to said first frame adjacent said front end thereof for movement between lower and upper positions; a camming member extending transversely across said first and second frames and having a camming connection with said second frame; means respectively pivotally connected to said side rail members for movement between first and second positions and having said camming member respectively connected thereto whereby said second frame is moved between said lower and upper positions thereof; and means connected respectively to said pivotally connected means for moving the same between said first and second positions thereof.

2. The combination of claim 1 wherein said pivotally connected means comprise sheaves with said camming member eccentrically connected thereto, and said moving means comprises cables respectively secured to said sheaves and trained therearound.

3. The combination of claim 1 wherein said pivotally connected means comprises sheaves respectively eccentrically connected to said side rail members and having said camming member respectively connected thereto at points radially spaced from the pivotal axes of said sheaves, and wherein said moving means comprises cables respectively secured to said sheaves and trained therearound.

4. The combination of claim 1 wherein said wheels are respectively pivotally connected to said side rail members by lever members and wherein the pivotal axes of said pivotally connected means and said lever members are respectively coincident.

5. The combination of claim 1 wherein said wheels are respectively pivotally connected to said members by lever members, wherein said pivotally connected means comprises sheaves respectively eccentrically connected to said side rail members on the same pivotal axes as said lever members, said camming member being connected to said sheaves at points spaced from the pivotal axes of said sheaves, and wherein said moving means comprises cables respectively secured to said sheaves and trained there around.

6. The combination of claim 1 further comprising a locking member extending transversely across said second frame and secured thereto, and means on said side rail members respectively cooperatively engaging said locking member in said upper position of said second frame for securing second frame in said upper position thereof.

7. A trailer comprising: a first elongated frame having front and rear ends and comprising a pair of side rail members transversely spaced apart at said rear ends and joined together at said front end; a pair of wheels for supporting said trailer on the ground; a pair of lever members each having one of said wheels rotatably connected to one end thereof and having its other end pivotally connected to a respective side rail member; a second elongated load-supporting frame pivotally connected intermediate its ends to said side rail members adjacent said front end for movement between lower and upper positions, said second frame having a portion extending rearwardly from its pivotal connection between said side rails and rearwardly of said wheels, and another portion extending forwardly having towing hitch means thereon; a pair of sheaves respectively eccentrically connected to said side rail members on the same pivotal axes as said lever members; a transversely extending camming member respectively having its ends connected to said sheaves at points radially spaced from the pivotal axes of said sheaves and having a camming connection intermediate its ends with said second frame whereby rotation of said sheaves causes said camming member to move said second frame between said lower and upper position thereof; cables respectively connected to said sheaves and trained therearound for rotating the same; and means for locking said second frame in said upper position thereof.

8. The combination of claim 7 wherein said side rail members respectively have portions extending rearwardly from the points of connection of said lever members and sheaves thereto; and further comprising means including coil springs respectively connecting said side rail portions and said lever members, and wherein said locking means comprises a locking member extending transversely across said second frame rearwardly of said wheels, and means on said side rail portions cooperatively engaging said locking member in said upper position of said second frame for securing said second frame in said upper position thereof.

9. A trailer comprising: a first elongated frame having front and rear ends and comprising a pair of side rail members transversely spaced apart at said rear end and joined together at said front end; a pair of wheels for supporting said trailer on the ground; a pair of plate members respectively secured to said side rail members intermediate their ends and depending therefrom; a pair of lever members respectively extending rearwardly from said plate members; a pair of pivot studs respectively pivotally connecting said lever members to said plate members, said wheels being respectively rotatably connected to said lever members rearwardly of said pivot studs; said side rail members respectively having portions extending forwardly and rearwardly from said plate members, said rearwardly extending portions being offset upwardly with respect to said forwardly extending portions; means including coil springs respectively connecting said rearwardly extending side rail portions and said lever members; a pair of circular sheaves respectively eccentrically connected to said plate members on the inner sides thereof by said pivot studs; a camming member extending transversely between said sheaves and having its ends respectively connected to said sheaves at points spaced radially outwardly from said pivot studs; a second elongated load-supporting frame pivotally connected intermediate its ends to said side rail members adjacent said front end for movement between lower and upper positions, said second frame having a portion extending rearwardly from its pivotal connection between said side rails over said camming member and rearwardly of said wheels, said second frame having another portion extending forwardly from its pivotal connection and having towing hitch means thereon; said camming member supporting said rearwardly extending portion of said second frame in camming relation whereby rotation of said sheaves about said pivot studs moves said second frame between said lower and upper positions thereof; cables respectively secured to said sheaves and trained therearound for rotating the same; winch means on said forwardly extending portion of second frame and having said cables connected thereto; a locking member secured to said frame and extending transversely thereacross rearwardly of said wheels; locking elements respectively secured to said rearwardly extending side frame members and depending therefrom, said locking elements respectively engaging the ends of said locking member when said second frame is in said upper position; and means for removably securing said locking elements and locking member together.

10. The combination of claim 9 wherein said second frame is a unitary elongated tongue member.

11. The combination of claim 9 wherein said locking member has a boat-supporting bolster member thereon and said second frame has boat-supporting rollers thereon.

References Cited in the file of this patent

UNITED STATES PATENTS

| | | |
|---|---|---|
| 2,650,730 | Rohm | Sept. 1, 1953 |
| 2,793,774 | Lovegreen | May 28, 1957 |
| 2,980,273 | Jernigan | Apr. 18, 1961 |